(12) United States Patent
Polia et al.

(10) Patent No.: US 8,839,028 B1
(45) Date of Patent: Sep. 16, 2014

(54) MANAGING DATA AVAILABILITY IN STORAGE SYSTEMS

(75) Inventors: Michael J. Polia, Hudson, MA (US); Jean Marie (Montes) Schiff, Bolton, MA (US); Kevin Schleicher, Bellingham, MA (US); Kimchi Mai, Worcester, MA (US)

(73) Assignee: EMC Corporation, Hopkinton, MA (US)

( * ) Notice: Subject to any disclaimer, the term of this patent is extended or adjusted under 35 U.S.C. 154(b) by 243 days.

(21) Appl. No.: 13/336,545

(22) Filed: Dec. 23, 2011

(51) Int. Cl.
*G06F 11/00* (2006.01)

(52) U.S. Cl.
USPC .......................................................... 714/6.24

(58) Field of Classification Search
USPC .................... 714/6.1, 6.2, 6.22, 6.24; 711/114
See application file for complete search history.

(56) References Cited

U.S. PATENT DOCUMENTS

| | | | | | |
|---|---|---|---|---|---|
| 5,305,326 | A | * | 4/1994 | Solomon et al. | 714/6.12 |
| 5,617,425 | A | * | 4/1997 | Anderson | 714/710 |
| 6,151,659 | A | * | 11/2000 | Solomon et al. | 711/114 |
| 6,154,853 | A | * | 11/2000 | Kedem | 714/6.22 |
| 6,269,453 | B1 | * | 7/2001 | Krantz | 714/6.22 |
| 6,546,458 | B2 | * | 4/2003 | Milligan et al. | 711/114 |
| 6,993,701 | B2 | * | 1/2006 | Corbett et al. | 714/770 |
| 7,577,866 | B1 | * | 8/2009 | Fan et al. | 714/6.24 |
| 7,827,351 | B2 | * | 11/2010 | Suetsugu et al. | 711/114 |
| 2010/0293439 | A1 | * | 11/2010 | Flynn et al. | 714/763 |

OTHER PUBLICATIONS

"Information Playground: CLARiiON Parity Shedding;" http://stevetodd.typepad.com/my_weblog/2008/04/clariion-parity.html; Published online on Apr. 20, 2008; Web Link operational as of Nov. 13, 2013.*

* cited by examiner

*Primary Examiner* — Scott Baderman
*Assistant Examiner* — Joseph Kudirka
(74) *Attorney, Agent, or Firm* — Deepika Bhayana; Krishnendu Gupta

(57) ABSTRACT

A method is used in managing data availability in storage systems. A request to write new data to a disk of a plurality of disks of a data storage system is received. The plurality of disks includes first and second parity areas. The first parity area includes first parity information and the second parity area includes second parity information. Up to two disks of the plurality of disks are having a problem. Old data of the disk is reconstructed in a memory of the data storage system. The reconstructed old data of the disk is written to a parity area. The parity area is selected from the first or second parity areas based on a configuration preference. The new data is written to the parity area.

17 Claims, 15 Drawing Sheets

DATA POSITION BEING WRITTEN IS IN FAILED STATE

| ROW PARITY SECTOR | DIAGONAL PARITY SECTOR | DATA DRIVE N | DATA DRIVE M | ACTION TO BE PERFORMED | REBUILD AND SHED OPERATION |
|---|---|---|---|---|---|
| failed | OK | OK | OK | Degraded Verify | NO |
| OK | failed | OK | OK | Degraded Verify | NO |
| failed | failed | OK | OK | Degraded write operation with no attempt to write to parity sectors | NO |
| OK | Shed Data | Rebuild | OK | Rebuild data drive $n$ and shed into diagonal parity sector. | YES |
| OK | Shed Data | OK | Rebuild | Rebuild data drive $m$ and shed into diagonal parity sector. | YES |
| Shed Data | Shed Data | Rebuild | Rebuild | Rebuild data drives $n$ and $m$ and shed into both row and diagonal parity sectors. | YES |
| failed | Shed Data | Rebuild | OK | Rebuild data drive $n$ and shed into diagonal parity sector. | YES |
| failed | Shed Data | OK | Rebuild | Rebuild data drive $m$ and shed into diagonal parity sector. | YES |
| Shed Data | failed | Rebuild | OK | Rebuild data drive $n$ and shed into row parity sector. | YES |
| Shed Data | failed | OK | Rebuild | Rebuild data drive $m$ and shed into row parity sector. | YES |

| RP | DP | D0 | D1 | D2 | D3 | D4 |
|---|---|---|---|---|---|---|
| Parity | Parity | Data0 | Data1 | Data2 | Data3 | Data4 |

192

| RP | DP | D0 (Failed) | D1 | D2 | D3 | D4 |
|---|---|---|---|---|---|---|
| Parity | Parity |  | Data1 | Data2 | Data3 | Data4 |

194

| RP | DP | D0 (Failed) | D1 | D2 | D3 | D4 |
|---|---|---|---|---|---|---|
| Parity | SHED [D0 Data] | Data is Shed to DP | Data1 | Data2 | Data3 | Data4 |
| Parity' | SHED [D0 Data] |  | Data1 | Data2 | Data3 | Data4 |

196

| RP | DP | D0 (Failed) | D1 | D2 (Failed) | D3 | D4 |
|---|---|---|---|---|---|---|
| Parity' | SHED [D0 Data] |  | Data1 |  | Data3 | Data4 |

198

| RP | DP | D0 (Failed) | D1 | D2 (Failed) | D3 | D4 |
|---|---|---|---|---|---|---|
| SHED [D2 Data] | SHED [D0 Data] |  | Data1 | Data is Shed to RP | Data3 | Data4 |

DATA POSITION BEING WRITTEN IS IN FAILED STATE

FIG. 6

DATA POSITION NOT BEING WRITTEN IS FAILED

210

| RP | DP | D0 | D1 | D2 | D3 (Failed) | D4 (Failed) |
|---|---|---|---|---|---|---|
| Parity | Parity | Data0 | Data1 | Data2 | | |

212

| RP | DP | D0 | D1 | D2 | D3 (Failed) | D4 (Failed) |
|---|---|---|---|---|---|---|
| SHED [D4 Data] | SHED [D3 Data] | Data0 | Data1 | Data2 | Reconstructed Data is Shed to DP | Reconstructed Data is Shed to RP |

PRE-SHEDING OPERATION

214

| RP | DP | D0 | D1 | D2 | D3 (Failed) | D4 (Failed) |
|---|---|---|---|---|---|---|
| SHED [D4' Data] | SHED [D3 Data] | Data0 | Data1 | Data2 | | |

| RP | DP | D0 | D1 | D2 | D3 (Failed) | D4 (Failed) |
|---|---|---|---|---|---|---|
| SHED [D4' Data] | SHED [D3 Data] | Data0 | Data1 | Data2' | | |

DATA POSITION BEING WRITTEN IS IN FAILED STATE

| RP | DP | D0 (Failed) | D1 | D2 (Failed) | D3 | D4 |
|---|---|---|---|---|---|---|
| SHED [D2 Data] | SHED [D0 Data] | | Data1 | | Data3 | Data4 |

*222

| RP | DP | D0 (Rebuild) | D1 | D2 (Failed) | D3 | D4 |
|---|---|---|---|---|---|---|
| SHED [D2 Data] | SHED [D0 Data] | Reconstruct Data in memory | Data1 | Reconstruct Data in memory | Data3 | Data4 |

*224

| RP | DP | D0 | D1 | D2 (Failed) | D3 | D4 |
|---|---|---|---|---|---|---|
| Parity | Parity | Data0 | Data1 | | Data3 | Data4 |

REBUILD – UNSHEDDING OPERATION

FIG. 9

MANAGING DATA AVAILABILITY IN STORAGE SYSTEMS

BACKGROUND

1. Technical Field

This application relates to managing data availability in storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

A traditional storage array (herein also referred to as a "data storage system", "disk storage array", "disk array", or simply "array") is a collection of hard disk drives operating together logically as a unified storage device. Storage arrays are designed to store large quantities of data. Storage arrays typically include one or more storage array processors (SPs), for handling both requests for allocation and input/output (I/O) requests. An SP is the controller for and primary interface to the storage array.

Storage arrays are typically used to provide storage space for one or more computer file systems, databases, applications, and the like. For this and other reasons, it is common for storage arrays to be logically partitioned into chunks of storage space, called logical units, or LUs. This allows a unified storage array to appear as a collection of separate file systems, network drives, and/or Logical Units.

A hard disk drive (also referred to as "disk") is typically a device can be read from or written to and is generally used to store data that will be accessed by the storage array. The hard disk drive is typically referred to as random access memory and is familiar to those skilled in the art. A disk may be a physical disk within the storage system. A LUN may be a logical unit number which is an identifier for a Logical Unit. Each slice of data may have a mapping on the location of the physical drive where it starts and ends; a slice may be sliced again.

Large storage arrays today manage many disks that are not identical. Storage arrays use different types of disks, i.e., disks with different RAID (Redundant Array of Independent or Inexpensive Disks) levels, performance and cost characteristics. In the industry there have become defined several levels of RAID systems.

Existing data storage systems may utilize different techniques in connection with managing data availability in data storage systems, for example, in the event of a data storage device failure. There are a number of different RAID (Redundant Array of Independent or Inexpensive Disks) levels and techniques that may be used in connection with providing a combination of fault tolerance and/or improved performance for data storage devices. Different RAID levels (e.g., RAID-1, RAID-5, RAID-6, and the like) may provide varying degrees of fault tolerance. Further, RAID parity schemes may be utilized to provide error detection during the transfer and retrieval of data across a storage system.

Generally, a RAID system is an array of multiple disk drives which appears as a single drive to a data storage system. A goal of a RAID system is to spread, or stripe, a piece of data uniformly across disks (typically in units called chunks), so that a large request can be served by multiple disks in parallel. For example, RAID-5 techniques can be used in connection with a data storage system to protect from a single device failure.

In a particular RAID-5 context, for example, which comprises a storage array of five disk modules, each disk has a plurality of "N" data storage sectors, corresponding sectors in each of the five disks being usually referred to as a "stripe" of sectors. With respect to any stripe, 80% of the sector regions in the stripe (i.e., in a 5 disk array effectively 4 out of 5 sectors) is used for user data and 20% thereof (i.e., effectively 1 out of 5 sectors) is used for redundant, or parity, data. The use of such redundancy allows for the reconstruction of user data in the event of a failure of a user data sector in the stripe.

When a user data disk module fails, the redundant or parity entry that is available in the parity sector of a stripe and the data in the non-failed user data sectors of the stripe can be used to permit the user data that was in the sector of the failed disk to be effectively reconstructed so that the system can remain operative using such reconstructed data even when the user data of that sector of the failed disk cannot be accessed. The system is then said to be operating in a "degraded" mode since extra processing operations and, accordingly, extra time is required to reconstruct the data in the failed disk sector when access thereto is required.

Certain kinds of failures, however, can occur in which the storage array is left in an incoherent or effectively unusable state, e.g., a situation can occur in which there is power failure, i.e., power to a storage processor fails or the storage processor itself fails due to a hardware or software defect, or power to the disk drives themselves fails.

Further, there is no protection with a RAID-5 technique for a double member failure, or two independent device failures of the same RAID group. Additionally, in the event a second fault occurs, for example, during a rebuild/resynchronization process of a RAID-5 system to recover from a first failure, the rebuild will fail with data loss. A RAID-5 system may use a RAID-5 parity shedding technique in order to recover from a single disk drive failure as described in U.S. Pat. No. 5,305,326, issued Apr. 19, 1994, Solomon, et al., HIGH AVAILABILITY DISK ARRAYS, which is incorporated by reference herein.

RAID-6 techniques may be used in connection with protection from such double faults. However, existing RAID-6 techniques may not operate as efficiently as may be desired in connection with certain failure situations.

Thus, it is desirable to devise techniques for managing data availability in such failure situations that cannot be handled by RAID-6 systems as currently designed and used.

SUMMARY OF THE INVENTION

A method is used in managing data availability in storage systems. A request to write new data to a disk of a plurality of disks of a data storage system is received. The plurality of disks includes first and second parity areas. The first parity area includes first parity information and the second parity area includes second parity information. Up to two disks of the plurality of disks are having a problem. Old data of the disk is reconstructed in a memory of the data storage system. The reconstructed old data of the disk is written to a parity area. The parity area is selected from the first or second parity areas based on a configuration preference. The new data is written to the parity area.

BRIEF DESCRIPTION OF THE DRAWINGS

Features and advantages of the present invention will become more apparent from the following detailed description of exemplary embodiments thereof taken in conjunction with the accompanying drawings in which:

FIGS. 2-9 are diagrams illustrating in more detail components that may be used in connection with techniques herein.

DETAILED DESCRIPTION OF EMBODIMENT(S)

Figure 1A:
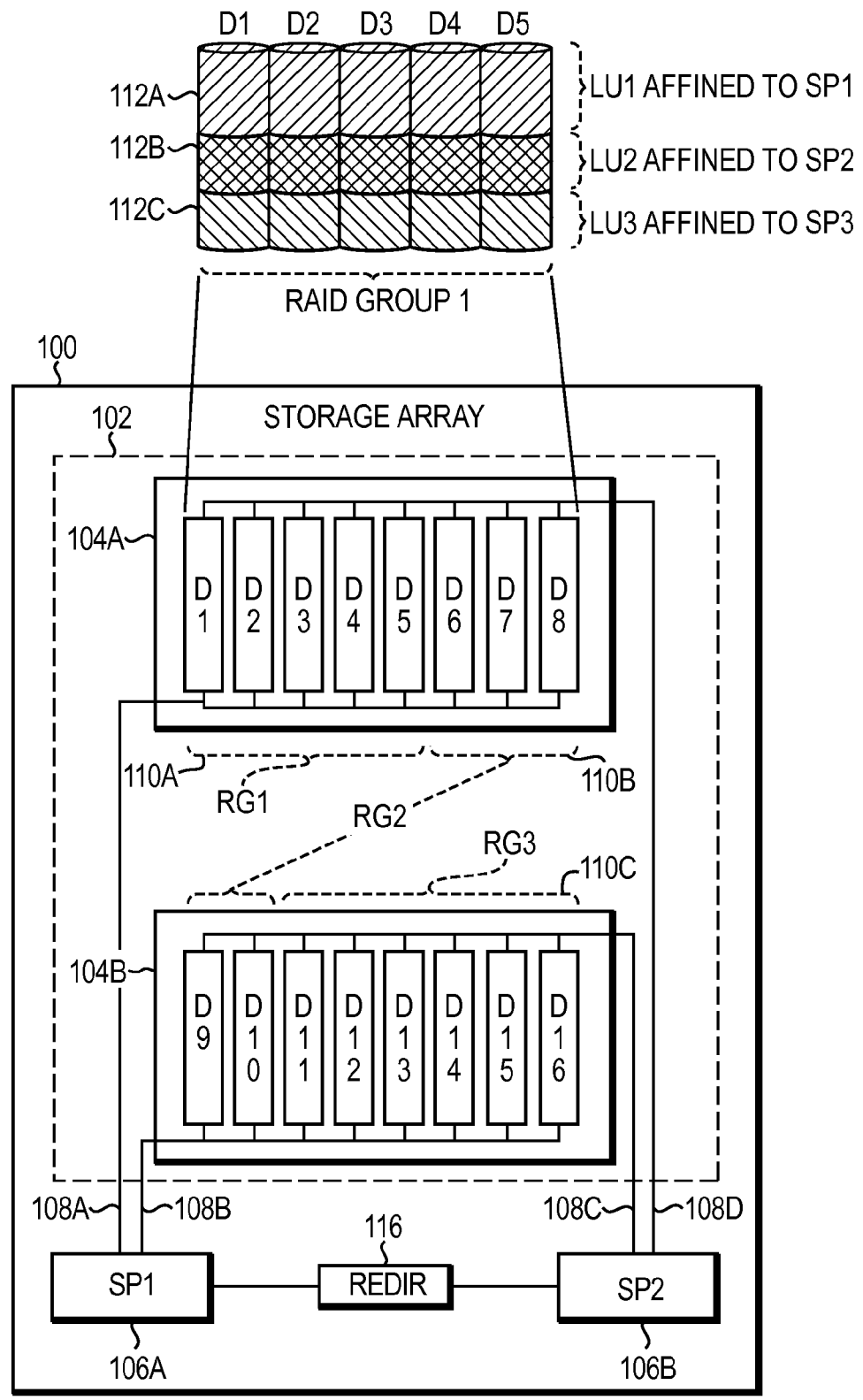
FIGS. 1A and 1B are an example of an embodiment of a computer system that may utilize the techniques described herein.

Described below is a technique for use in managing data availability in storage systems, which technique may be used to provide, among other things, receiving a request to write new data to a disk of a plurality of disks of a data storage system, where the plurality of disks includes first and second parity areas, where the first parity area includes first parity information and the second parity area includes second parity information, where up to two disks of the plurality of disks are having a problem, reconstructing old data of the disk in a memory of the data storage system, writing the reconstructed old data of the disk to a parity area, where the parity area is selected from the first or second parity areas based on a configuration preference, and writing the new data to the parity area.

Generally, a RAID-6 system uses a dual redundancy parity scheme which includes a horizontal redundancy and a diagonal redundancy. For N data devices or drives, two parity positions are used. The first parity position is referred to as the row parity position (also referred to herein as "horizontal parity", "RP"). The second parity position is referred to as a diagonal parity position (also referred to as "DP"). The first and second parity positions are utilized in connection with a data unit grouping of size N−2 to encode parity information thereon of the N−2 data drives, as will be described in more detail herein. From these two types of parities, it is possible to reconstruct data even when there are up to two adjacent failures of disks or blocks. The failures can be on the data disks, parity disks or some combination thereof. Thus it provides a higher level of fault tolerance compared with a RAID-5 system. Thus, a RAID-6 system enables a user to continue reading and writing data even after a failure of up to two disk drives. The storage system reads data from a failed disk drive by reconstructing the data using parity information. Further, a storage system writes new data that is mapped to a non-operational (also referred to as "failed") disk drive by reading data from adjacent disk drives, calculating new parity by combining the adjacent data with the new data, and writing the new parity to parity positions or parity drives. Thus, a RAID-6 system may appear functional to a user even though up to two disk drives in a RAID group fails.

Typically, if a single data drive of a storage system fails due to a problem such as the drive is missing or the drive is in a degraded (also referred to as "failed") mode, any one of the two parity schemes of a RAID-6 level provides data availability and data consistency by reconstructing data for the failed data drive. Conventionally, if a second data drive of a storage system fails concurrently, the storage system operates in a "double degraded" mode indicating failure of two disks. In such a conventional system, a storage system operating in the double degraded mode may lose user data if a third disks including a parity sector fails. Thus, in such a conventional system, if only two data drives of a storage system fails due to a problem, data for the two failed drive may be reconstructed by using parity information (e.g., RP, DP). However, in such a conventional case, if a third disk of a storage system fails when the storage system is operating in the double degraded mode, it may be difficult or impossible for the storage system to reconstruct data of the first two failed data drives. Thus, in such a conventional system, data residing on each data drive of a storage system is available to a user and protected from data loss only until up to two data drives fails due to a problem.

Further, conventionally, a write operation that is directed to two or more sectors writes to each sector concurrently. In such a conventional case, if a write to a sector fails to complete successfully due to a problem (e.g., a power failure), data disk drives of a storage system may include inconsistent data which may be a combination of old and new data. As a result in such a case, a storage system may lose user data if a write to a sector is interrupted when the storage system includes up to two failed (e.g., missing, degraded) disk drives. Thus, in such a conventional case, if a writes failure to a sector is not detected and corrected, it is difficult or impossible for a storage system to reconstruct data of a failed disk drive. Further, in such a conventional case, a storage system may lose a parity redundancy causing the storage system to lose data of each sector of a stripe. Thus, in such a conventional case, one of the mechanisms that may be used to reconstruct data of a failed disk is to continue caching data associated with each write I/O request until each write operation of the write I/O request completes successfully. However, in such a conventional system, caching data for each write operation requires a large amount of storage resources.

By contrast, in at least some implementations in accordance with the current technique as described herein, a RAID-6 parity shedding technique (also referred to herein simply as "parity shedding") enables a storage system to recover data of a failed disk when the storage system is operating in a degraded mode (e.g., single degraded mode, double degraded mode). In at least one embodiment, the parity shedding technique stores data for a failed data disk drive in a parity area, and updates metadata to indicate that the parity area stores data of the failed data disk drive instead of storing parity information. The process of storing user data in a parity area instead of parity information is referred to as "shedding data". Further, data that is written to a parity area is referred to as "shed data". Thus, in a RAID-6 system, use of the parity shedding technique in a storage system makes data of each disk drive in a RAID group available to a user when the storage system operates in a degraded mode (e.g., single degraded mode, double degraded mode). As a result of shedding data to two parity areas, no disk drive of the RAID group is protected by a RAID-6 parity scheme as the parity areas do not include parity information. However, in such a case, in at least one embodiment of the current technique, data for two failed disk drive may be reconstructed because the data is stored in parity areas as shed data. Thus, in such a case, if a third disk fails in a storage system, a user may lose only the data associated with the third disk. Thus, in at least one embodiment of the current technique, a storage system may access data of a failed disk by reading the data from a parity area. Further, a storage system may update data of a failed disk by storing the data associated with subsequent write I/O requests directed to the failed disk in a parity area. As a result, if a storage system is operating in the double degraded mode, the storage system does not update parity areas with parity information. Further, in at least one embodiment of the current technique, if a failed disk drive of a storage system is replaced by a new disk drive, a rebuild process restores data to the new disk drive by either reconstructing the data from parity information or by copying shed data from a parity area to the new disk drive.

In at least some implementations in accordance with the current technique as described herein, the use of the managing data availability in storage systems technique can provide one or more of the following advantages: lowering storage costs by improving efficiency of the data storage system, improving data availability by reconstructing data of a failed disk from adjacent data disk sectors and parity sectors associated with the failed disk such that the data is not lost when up to two disk drives fails due to a problem, and reducing or eliminating data loss by storing data of a failed disk in a parity area if a data storage system is operating in a degraded mode.

Referring now to FIG. 1A, shown is an example of an embodiment of a computer system that may be used in connection with performing the technique or techniques described herein. Data storage system 100 includes multiple storage devices 102, which are typically hard disk drives, but which may be tape drives, flash memory, flash drives, other solid state drives, or some combination of the above. In at least one embodiment, the storage devices may be organized into multiple shelves 104, each shelf containing multiple devices 102. In the embodiment illustrated in FIG. 1A, data storage system 100 includes two shelves, Shelf1 104A and Shelf2 104B; Shelf1 104A contains eight storage devices, D1-D8, and Shelf2 also contains eight storage devices, D9-D16.

Data storage system 100 may include one or more storage processors 106, for handling input/output (I/O) requests and allocations. Each storage processor 106 may communicate with storage devices 102 through one or more data buses 108. In at least one embodiment, data storage system 100 contains two storage processors, SP1 106A, and SP2 106B, and each storage processor 106 has a dedicated data bus 108 for each shelf 104. For example, SP1 106A is connected to each storage device 102 on Shelf1 104A via a first data bus 108A and to each storage device 102 on Shelf2 104B via a second data bus 108B. SP2 106 is connected to each storage device 102 on Shelf1 104A via a third data bus 108C and to each storage device 102 on Shelf2 104B via a fourth data bus 108D. In this manner, each device 102 is configured to be connected to two separate data buses 108, one to each storage processor 106. For example, storage devices D1-D8 may be connected to data buses 108A and 108C, while storage devices D9-D16 may be connected to data buses 108B and 108D. Thus, each device 102 is connected via some data bus to both SP1 106A and SP2 106B. The configuration of data storage system 100, as illustrated in FIG. 1A, is for illustrative purposes only, and is not considered a limitation of the current technique described herein.

In addition to the physical configuration, storage devices 102 may also be logically configured. For example, multiple storage devices 102 may be organized into redundant array of inexpensive disks (RAID) groups, or RGs 110, shown in FIG. 1A as RG1 110A, RG2 110B, and RG3 110C. Storage devices D1-D5 are organized into a first RAID group, RG1 110A, while storage devices D6-D10 are organized into a second RAID group, RG2 110B. Storage devices D11-D16 are organized into a third RAID group, RG3 110C. In at least one embodiment, a RAID group may span multiple shelves and/or multiple buses. For example, RG2 110B includes storage devices from both Shelf1 104A and Shelf2 104B.

Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 1A, RG1, which includes storage devices D1-D5, is sub-divided into 3 logical units, LU1 112A, LU2 112B, and LU3 112C.

Figure 1B:
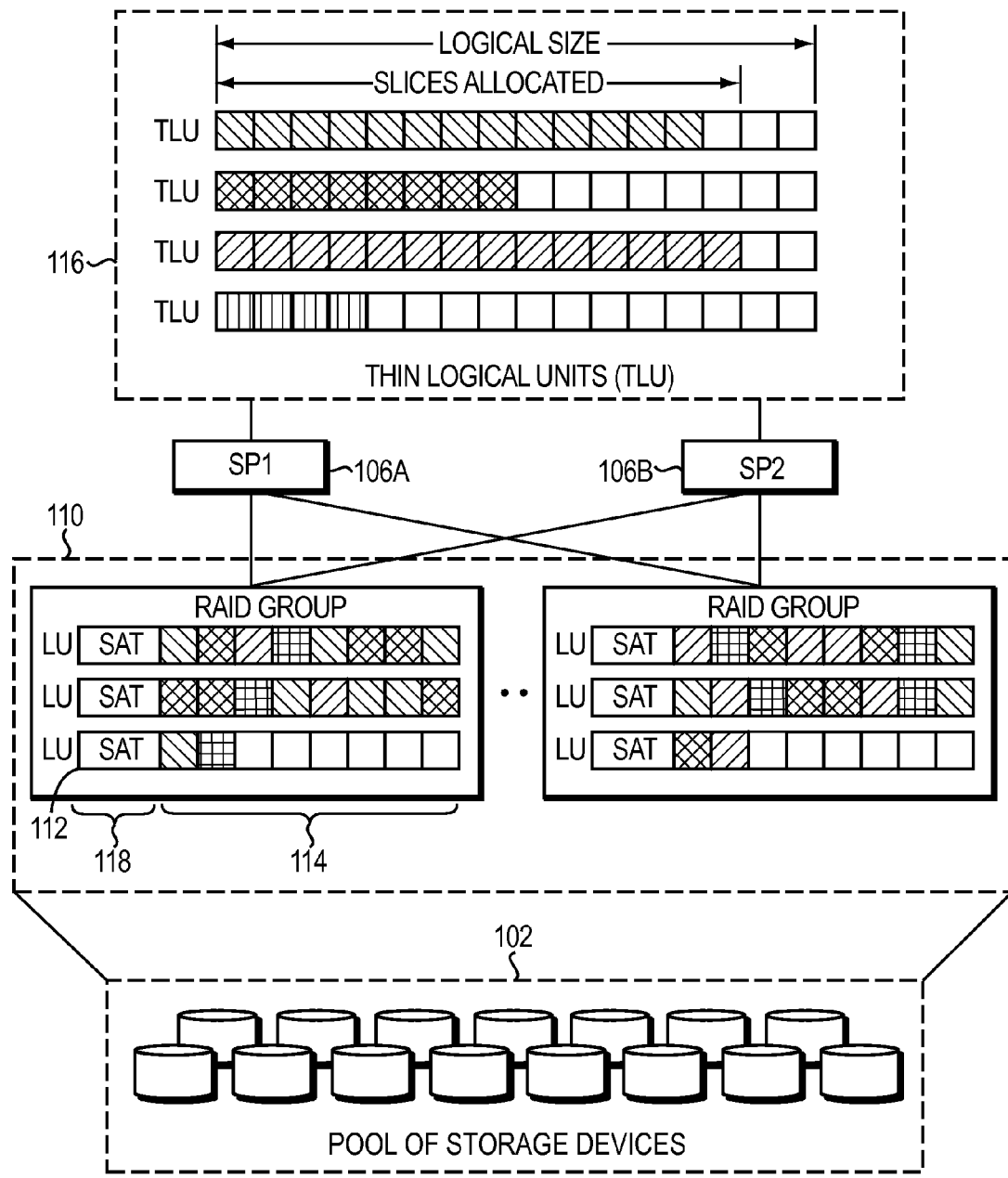

FIG. 1B is a block diagram illustrating another view of an embodiment of a computer system that may be used in connection with performing the technique or techniques described herein. In the simplified view shown in FIG. 1B, a pool of storage devices 102 are organized into multiple RAID groups 110, and each RAID group is further divided into a number of LUs from which slices 114 are allocated to one or more thin logical units (TLUs) 116. TLUs 116 may have a logical size that is larger than the current actual size. The actual size is determined by the number of slices actually allocated to the TLU 116. The slices that are allocated to a TLU 116 may be physically located anywhere in storage array 100. Further, these slices may be located more or less contiguously, but they may also be distributed more or less evenly across all physical resources, depending on the slice selection and allocation policy or algorithm. Other physical distributions are within the scope of the current technique claimed herein.

In at least one embodiment, storage processors 106A, 106B are responsible for allocating storage and maintaining information about how that allocated storage is being used. Storage processors 106A, 106B may maintain information about the structure of the file system whose contents are being stored in the allocated slices. In one implementation of storage array 100, each logical unit 112 is associated with a slice allocation table (SAT) 118, which is used to record information about each slice 114, such as the TLU that is using the slice 114 and whether the slice is free or allocated. The SAT 118 may be stored in the logical unit 112, or it may be stored outside the logical unit 112 to which it is associated.

In at least one embodiment, in order to avoid contention between two or more storage processors 106A, 106B attempting to modify a particular SAT 118, each SAT 118 is controlled by only one storage processor 106. The storage processor 106 that has been given ownership of a particular SAT 118 is hereinafter referred to as the "claiming SP" for that SAT 118. Since the SAT 118 for a logical unit 112 contains information about slices within that logical unit 112, the claiming SP of a SAT 118 may be said to be the claiming SP of the logical unit, also. The remaining storage processors 106 that are not the claiming SP for a logical unit 112 are hereinafter referred to as the "peer SP". Thus, every logical unit 112 may have one claiming SP and one or more peer SPs. Since the claiming SP may be determined for each logical unit 112 individually, logical units within the same RAID group 110 may have different claiming SPs. As used herein, the term "affining" refers to the process of associating a logical unit 112 to a storage processor 106, which then becomes the claiming SP of that logical unit 112. The term "affinity" refers to a characteristic of a logical unit 112, the characteristic indicating the association of that logical unit 112 to a particular storage processor 106. A logical unit 112 is said to have an affinity for or toward a specific storage processor 106.

In at least one embodiment, if one storage processor 106 receives an I/O request for a slice that resides within a logical unit 112 that has been affined to another storage processor 106, that I/O request may be denied, since the first storage processor does not have access to the slice allocation table for the logical unit 112 in question. In an alternative embodiment, a request for I/O access to a particular logical unit 112 may be redirected from peer SP that received the request to the claiming SP via a redirector 116. However, redirection incurs a performance penalty due to the time taken to detect the improper request, identify the appropriate storage processor, and redirect the request to the identified storage processor. Similarly, in at least one embodiment, a peer SP may not be permitted to have allocated to it slices from a logical unit 112 claimed by another SP. For example, referring to FIG. 1A, SP1 106A may not be allowed to have slices from LU2 112, since that LU has been affined to SP2 106B. In this scenario, the slices on LU2 112 are said to be "orphaned" with respect to any peer SP, which in this example is any storage processor 106 other than SP2 106B. Thus, the slices on LU2 112 are orphaned with respect to SP1 106A.

Figure 2:
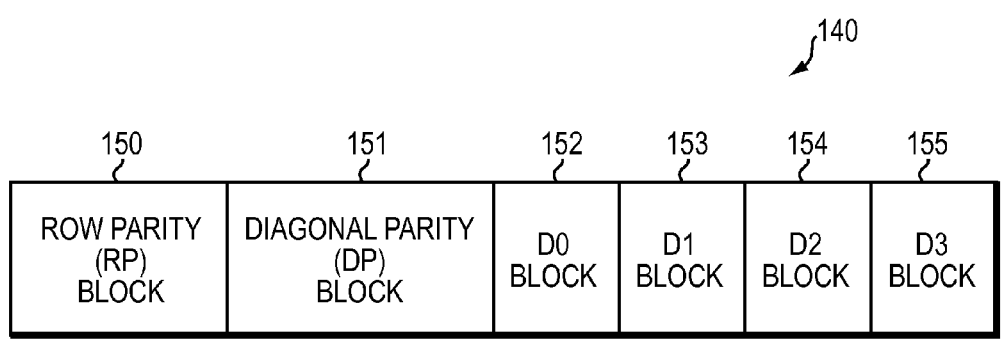

Referring to FIG. 2, shown is an example representation of a RAID-6 technique configuration that may be used in connection with the techniques herein. The example 140 includes 4 data drives (e.g., 152, 153, 154, 155) and 2 parity drives. The example 140 includes 2 parity drives denoting row parity ("RP") segments 150 and diagonal parity ("DP") segments 151. The particular relationships between data segments (represented as D0 152, D1 153, D2 154, D3 155) and parity segments (represented as DP 151 and RP 150) may vary with each particular RAID implementation using the techniques herein. For example, an embodiment may use a RAID-6 technique as described in "EVEN-ODD: An Efficient Scheme for Tolerating Double Disk Failures in RAID Architectures", IEEE Transactions on Computers, Vol. 44, No. 2, February 1995, by Blaum et al., where the RP of a row is based on the logical XOR of each data segment in the row.

In at least one embodiment of the current technique, row parity 150 information may be determined utilizing an XOR (exclusive-OR) logical operation. However, it should be noted that the parity information utilized in connection with the techniques described herein may be determined using other operations and processing steps as known to those of ordinary skill in the art. The XOR logical operation may be selected in an embodiment because, for example, due to the efficiency of performing such an operation. The values associated with the XOR logical operation also reflect the correct parity values. Further, diagonal parity 151 information may be computed based on diagonal parity redundancy of different data segments.

In at least one embodiment of the current technique, for example, in FIG. 2, if any one of the data drives fail resulting in a write failure to any one of the respective data segments (D0 block 152, D1 block 153, D2 block 154, D3 block 155) in the data drives, data of the failed drive may be reconstructed using parity information such as row parity 150, and diagonal parity 151. In at least one embodiment of the current technique, if a write operation to a logical unit of a RAID-6 group operating in a degraded mode fails to complete successfully, the RAID-6 parity shedding technique helps in managing data availability and data consistency for the RAID-6 group. A write operation that fails to complete successfully is also referred to as an "incomplete write" operation. An incomplete write operation may be caused by an event (such as a storage processor panic, a loss of power in a disk enclosure, pulling out a backend cable in a disk enclosure) that interrupts the write operation.

Further, in at least one embodiment of the current technique, an update operation may be performed to a data segment of one of the data drives D0 152 through D3 155. A data update operation may be performed, for example, in connection with a host issuing a write operation. An update operation, such as a write operation, may be performed to a track, block or other portion of a data storage device. First, the corresponding data segment for that portion being modified is determined. Then, as part of performing the update operation, the corresponding parity segments 150, 151 for the data segment being modified is also updated. For example, with reference to FIG. 2, if data segment D0 block 152 is updated, the corresponding RP segment 150 is also updated so that the parity information in RP 150 is representative of the parity after applying the write or other update operation. Further, as part of performing the update operation, the corresponding DP segment 151 for the data segment being modified is also updated. For example, with reference to FIG. 2, if data segment in D0 block 152 is updated, the corresponding DP parity 151 is also updated so that the parity information of DP 151 is representative of the parity after applying the write or other update operation. Generally, a set of write operations directed to data segments and parity segments are performed concurrently.

Figure 3:
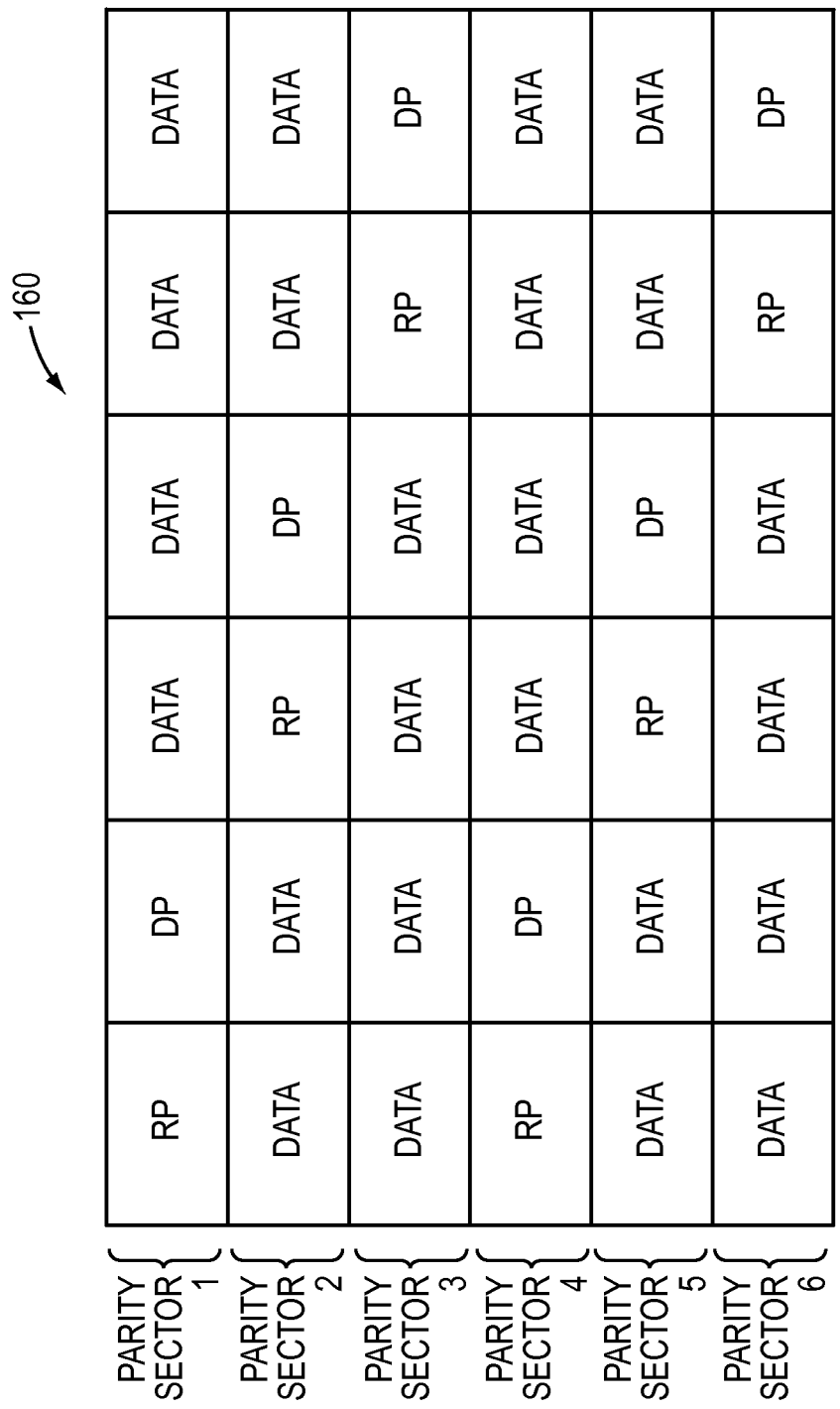

Referring to FIG. 3, shown is an example representation of a RAID-6 technique configuration that may be used in connection with the techniques herein. The example 160 includes N (e.g., 4) data drives. Each data drive is represented as a column of M (e.g., 6) data segments. Each data segment corresponds to an element within a particular column. The example 160 also includes P (e.g., 2) parity drives, P being greater than or equal to 1. N, the number of data drives, may generally be greater than or equal to the number of parity drives, P, with any RAID level (e.g., RAID-0, 1, 2, 3, 4, 5, 6, and the like) in connection with the techniques herein. The particular relationships between data segments (represented as "data" segments) and the parity segments (denoted by "RP" and "DP") may vary with each particular RAID implementation using the techniques herein. For example, an embodiment may use a RAID-6 technique as described in U.S. patent application Ser. No. 11/167,704, filed Jun. 27, 2005, Fan, et al., TECHNIQUES FOR FAULT TOLERANT DATA STORAGE, now U.S. Pat. No. 7,577,866 issued on Aug. 18, 2009,which is incorporated by reference herein.

The example 160 illustrates how parity information (such as RP and DP) for each row or stripe may be stored on RAID group members. In the example 160, each column corresponds to a RAID group member drive across which a row of data and parity information is striped. The example 160 illustrates the data portions (such as "data") and corresponding parity information portions (such as RP, DP) as operated upon and generated using a RAID-6 technique as described herein. In one embodiment, the data in the example 160 may represent data included in a single "slice" of data. A slice of data may be defined as the data included in a same row that is striped across all the member drives in the RAID group. In one embodiment, the striping unit size or width of a slice is 1 track. The data included in a slice having N+P RAID group members corresponds to the N+P tracks written to each RAID group member included in a single row. In this example, the RAID-6 technique generating the parity information may operate on portions of a track in which each portion is denoted by a "data", "RP" or "DP" in FIG. 3. The RAID-6 technique may operate on a portion of a track or other unit of storage.

As known in the art, all the segments in the example 160 may collectively represent information included in a single slice or stripe of data of a logical device or volume (e.g., LV) that is striped or distributed across RAID group data members. The data segments and the segments of parity information of the example 160 may be included in a same single slice or stripe. Each slice may correspond to a track or some other partitioned unit of storage. For purposes of illustration in this example, a slice or stripe may correspond to a track of data or some other configurable size or stripe unit referring to the size of the portions written to each disk or RAID group member. With respect to FIG. 3, the size of each segment ("data" or "RP" or "DP") may correspond to a portion of a track as operated upon by the underlying RAID-6 technique.

It should be noted that each cell or element in the arrangements described herein, for example, as in connection with FIG. 3, may correspond to a symbol of information. The size of a symbol in an embodiment may vary. For purposes of illustration and example, the size may be a single bit. However, the actual symbol size utilized in an embodiment may vary. For example, in one embodiment in which a column of the arrangement corresponds to a stand alone physical storage device such as a disk, a symbol may correspond to data on a single disk sector or other data partitioning scheme that may be used in an embodiment. Each data segment may be formed by performing the exclusive OR logical operation (XOR) of N−1 data segments on corresponding diagonal lines of the example 160. Thus, in the example 160, "parity sector-1" may refer to a first stripe, "parity sector-2" may refer to a second stripe, "parity sector-3" a third stripe, "parity sector-4" a fourth stripe, "parity sector-5" a fifth stripe, and "parity sector-6" a sixth stripe. The parity information corresponding to each stripe is stored across different devices or drives of a same RAID group of devices. For example, the parity information for the first stripe is stored on drives represented by first two columns. The parity information for the second stripe is stored on drives represented by the third and fourth columns, and so on for the other data stripes in the illustration. In one embodiment, disk controllers store parity information to the appropriate devices in accordance with the particular data segment which is the target of a data update operation, such as a write operation. Other arrangements of the storing the parity and corresponding data segments are possible using the techniques described herein. Thus, in connection with a single update to one data unit, updates to the parity positions (e.g., RP, DP) associated with the stripe in which the data unit resides are required.

As will be appreciated by those skilled in the art, the configuration of FIG. 3 is only one such RAID grouping configuration for a RAID-6 technique that may be used in connection with the techniques herein which are more generally applicable to any RAID level and configuration having one or more data members and one or more parity members. Further, for purposes of illustration, each segment may correspond to a single track although actual implementations may vary the size of each segment utilized in connection with the layout techniques described herein. As described above, for purposes of illustration, each data segment is a single track. It will be appreciated by those skilled in the art that the general steps described herein may be modified for use with a stripe size or data segment size of other than a single track. Further, it should be noted that parity positions (such as RP, DP) may rotate together across data stripes. Thus, all drives in a RAID group may be utilized efficiently for storing data and parity information.

Figure 4:
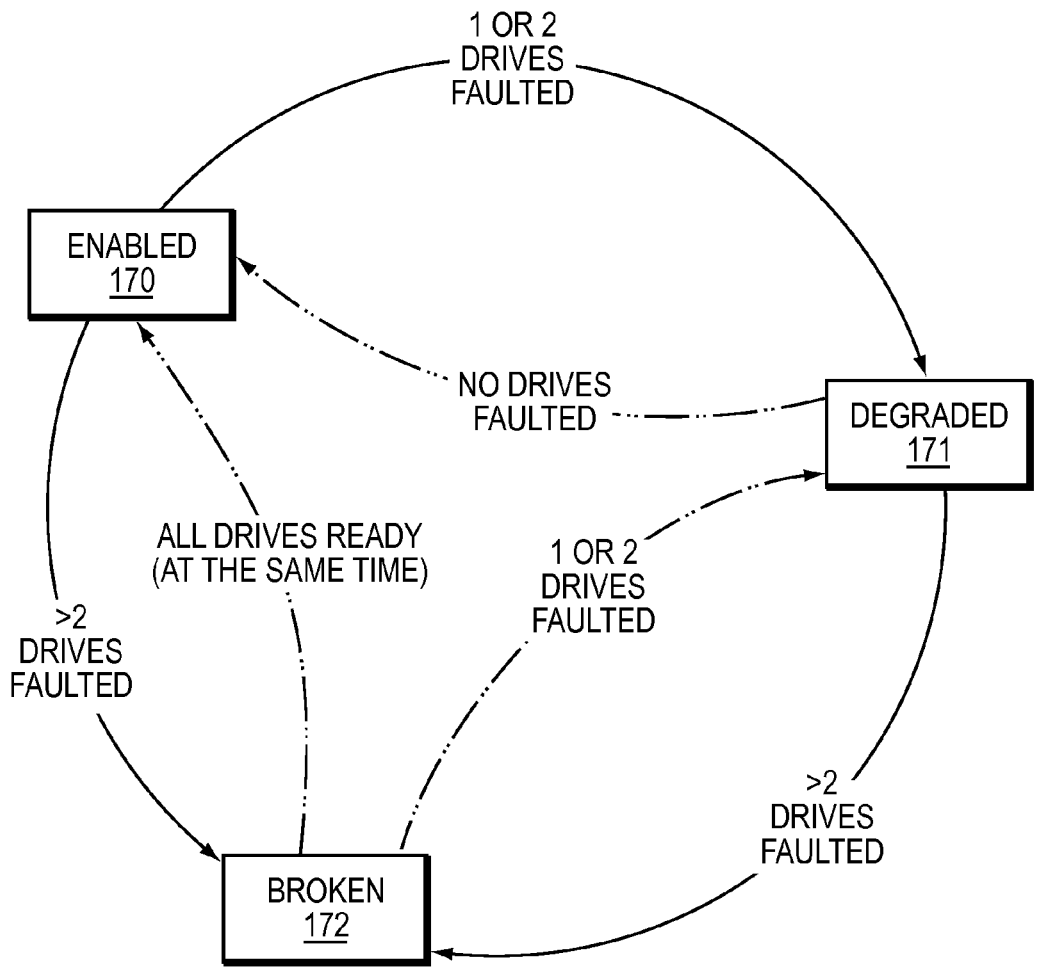

Referring to FIG. 4, shown is an illustration of life cycle of a storage device (e.g., disk drive) in a data storage system that may be included in an embodiment using the techniques described herein. In at least one embodiment of the current technique, a data storage system operates in "enabled" state 170 if each disk drive in the data storage system is functional and data of each of the disk drive is available to a user of the data storage system. The data storage system transitions to a "degraded" state 171 when either one or two disk drives in a RAID group fail due to a problem (e.g., a missing drive, a power failure). The data storage system transitions from the "degraded" state 171 to "enabled" state 170 when each failed drive is replaced with a new disk drive. However, if more than two disk drives fail to function, the data storage system transitions to "broken" state 172. In such a case, data for the first two failed drives may be reconstructed and recovered using the RAID-6 parity shedding technique. However, it may be difficult or impossible for the data storage system to recover data associated with the third failed disk. Further, the data storage system transitions from the "broken" state 172 to "enabled" state 170 when each failed drive is replaced and starts functioning.

Referring to FIG. 5, shown is an illustration of steps performed in a data storage system that may be included in an embodiment using the techniques described herein. The example 180 includes a list of use cases illustrating different failure scenarios in a data storage system that is operating in a "degraded" mode indicating that the data storage system includes at least one failed disk drive. In FIG. 5, the first three failure scenarios illustrate a situation in which a drive that includes parity information has failed indicating that a shedding operation may not not performed in such a case. The remaining seven failure scenarios listed in the example 180 illustrate a situation in which the parity shedding technique is used to recover data of a failed drive if the data storage system is operating in a degraded mode.

Referring to FIGS. 6-9, shown is an illustration of the parity shedding technique in a RAID-6 group of a data storage system. In at least some implementations in accordance with the technique as described herein, a disk drive may fail due to a problem. The problem may include a failure such as a power failure to a storage processor, a hardware failure in the storage processor, a power failure to a disk drive. In at least one embodiment of the current technique, a write operation is a degraded write if the write operation is directed to a failed disk drive. Upon detection of a degraded write operation, the parity shedding technique writes data associated with the write operation to a parity area (also referred to herein as "parity sector", "parity segment" or "parity drive") as "shed data". A parity sector includes metadata such as a shed bit of a shed stamp field indicating that information written to the parity sector is user data for a failed disk drive and no longer stores parity information. Thus, with reference back to FIG. 2, for example, if a disk including data segment D1 153 fails, data associated with a write request that is directed to D1 153 is written to diagonal parity 151 as "shed data". Further, if a write request includes a write operation directed to an operational disk, shed data for a failed drive is written to a parity area before writing host data associated with the write operation directed to the operational disk drive. As a result, by writing shed data to a parity area before writing host data to a functional data drive ensures consistency of data across a stripe in a RAID group. Further, if disk drives associated with two parity areas fail but data segments are functional, data associated with a degraded write is written to a data disk drive and parity information corresponding to the degraded write operation is not updated.

Further, in at least one embodiment of the current technique, the parity shedding technique includes an internal rebuild operation and a data shed operation such that the internal rebuild operation reconstructs data contents of a failed disk drive in a memory of the data storage system 12, and the data shed operation writes the reconstructed data to a parity area.

With reference also to FIGS. 1 and 2, in at least one embodiment of the current technique, a configuration manager ("CM") component of data storage system 12 includes a mapping between a failed data segment position and parity shed sector position. If data storage system 12 does not include a failed disk drive, the mapping in the configuration manager is empty, and available for storing parity information. However, if a disk drive of data storage system 12 transitions to a degraded mode (or "failed" state), the configuration manager selects an available parity position and maps the parity position to the failed drive. Further, if a failed disk drive is replaced by a new disk, the mapping for the failed disk is removed, and the parity position associated with the failed disk becomes available for storing parity information. In at least one embodiment of the current technique, if data storage system 12 includes two failed disk drives, the first failed drive is mapped to a diagonal parity position and the second failed drive is mapped to a row parity position.

In at least one embodiment of the current technique, a degraded write in accordance with the parity shedding technique is performed in two phases when a data storage system is in a single degraded mode. The first phase writes new host data associated with a write operation which is directed to a failed data disk to a parity area as "shed data". The parity area for writing the shed data is selected based on a configuration preference. The second phase writes new host data associated with a write operation which is directed to a non-failed data disk and concurrently updates a parity area that does not include shed data.

In at least one embodiment of the current technique, a degraded write in accordance with the parity shedding technique is performed in three phases when a data storage system is in a double degraded mode. The first phase is referred to as a "pre-shedding". The first phase includes a set of write operations that does not involve writing host data to a functional disk drive. The "pre-shedding" operation first reconstructs data of a degraded data position in a memory of data storage system 12 such that the reconstructed data includes existing data indicating user data that has not been updated yet with host data associated with the write I/O request. The "pre-shedding" operation then writes the reconstructed data as "shed data" to a parity position associated with the degraded data position. Data written by the pre-shedding operation is also referred to as "pre-shed" data. In such a case, if the parity position includes data identical to the shed data, the shed data is not written to the parity position. Further, two parity positions associated with two failed data disks are updated with respective reconstructed data for the two failed data disks. In such a case, old data for each of the failed data disk is written to the respective parity position concurrently. Further, the "pre-shedding" operation for a degraded write must complete successfully before the data storage system 12 can start executing the second phase of the degraded write operation. As a result, successful completion of the first phase of a degraded write ensures that a data stripe is consistent in such a way that the data stripe includes unmodified user data on functional (also referred to as "non-degraded" or "operational") data positions and "pre-shed" data on parity positions indicating unmodified and reconstructed user data corresponding to failed data positions. Thus, in at least one embodiment of the current technique, if one or more write operations that are directed to a functional disk and performed during the third phase of a degraded write operation fails to complete successfully, data storage system 12 is able to recover data associated with a failed disk drive by retrieving "pre-shed" data from a parity position associated with the failed disk.

In at least one embodiment of the current technique, the second phase is referred to as a "post shedding" operation. The "post shedding" operation of a degraded write writes new host data to a parity area that includes shed data for a data position associated with a failed drive. Thus, if a write operation is directed to a failed disk for which data has been reconstructed and written to a parity position as "pre-shed" data during the first phase, the write operation updates the pre-shed data in the parity position based on new host data associated with the write operation. The host data written to the parity position as part of the second phase is also referred to as "post-shed" data. A successful completion of the second phase ensures that the data stripe is consistent such that the data stripe includes new host data as "post-shed" data on the parity shed sector positions.

In at least one embodiment of the current technique, the third phase is referred to as a "data write" operation. A degraded write may include a set of write operations such that one or more write operation of the set of write operations may be directed to a functional disk. In such a case, if a write operation is directed to a functional disk drive, the "data write" phase writes host data associated with the write operation to the functional disk drive and updates a parity position which does not include "shed data". Further, data storage system 12 writes host data and updates parity concurrently. A successful completion of the third phase ensures that the data stripe is consistent such that the data stripe includes new host data on the operational data positions. Further, it should be noted that the second phase must wait for the first phase to complete successfully and the third phase must wait for the second phase to complete successfully.

Referring to FIG. 6, shown is an illustration of the "parity shedding" technique in a RAID-6 group of a data storage system that may be included in an embodiment using the techniques described herein. With reference also to FIGS. 1-4, in at least one embodiment of the current technique, for example, a use case in FIG. 6 illustrates a scenario in which a write I/O request is directed to a data position that is in a failed state. In the example 190, data storage system 12 does not include a failed data disk drive and thus writes data associated with a write I/O request to a target data position based on the RAID-6 technique described above in FIG. 2. In the example 192, the data storage system 12 transitions to the "degraded" mode 171 because one data drive (e.g., "D0") fails and transitions to a failed state. In example 194, data storage system 12 receives a write I/O request such that the write I/O request includes a write operation directed to a data position that is associated with the failed data disk drive (e.g., "D0"). In such a case, in accordance with the "parity shedding" technique described above herein, data associated with the write I/O request directed to the failed data disk (e.g., "D0") is written as shed data to a parity position associated with the failed disk. For example, in the example 194, the shed data is stored in DP. In a next step, parity information stored in any remaining parity position (e.g., "RP") is updated with new parity information based on the shed data and data from other functional drives (e.g., D1-D4). Additionally, metadata of a parity sector is updated to indicate that parity information of a parity position (e.g., DP) has been replaced by shed data of a failed data drive (e.g., D0). Thus, if a storage processor of the data storage system 12 desires to read the data in the data position "D0" of the failed disk which data can not be read from the failed disk itself, the storage processor examines the metadata in the parity sector to determine if such data has been written in a parity position in the parity sector in place of parity information. If it has, then the storage processor can safely access the shed data directly from the parity position and be assured that it is the data of data position "D0" of the failed data disk.

Further, if a second data disk such as "D2" fails in the data storage system 12 as illustrated by the example 196, the data storage system operates in the double degraded mode. In such a case 198, if the data storage system 12 receives a write I/O request that includes a write operation directed to the second failed data disk (e.g., "D2"), data for the second failed data disk is reconstructed and written to the remaining parity position RP as shed data in a similar way the update has been made to the parity position DP in the example 194. Thus, the reconstructed data for the second failed drive "D2" is written to the parity position RP as "shed data". Additionally, metadata of the parity sector is updated to indicate that parity information of the parity position RP has been replaced by the shed data for the failed data drive.

Figure 7:
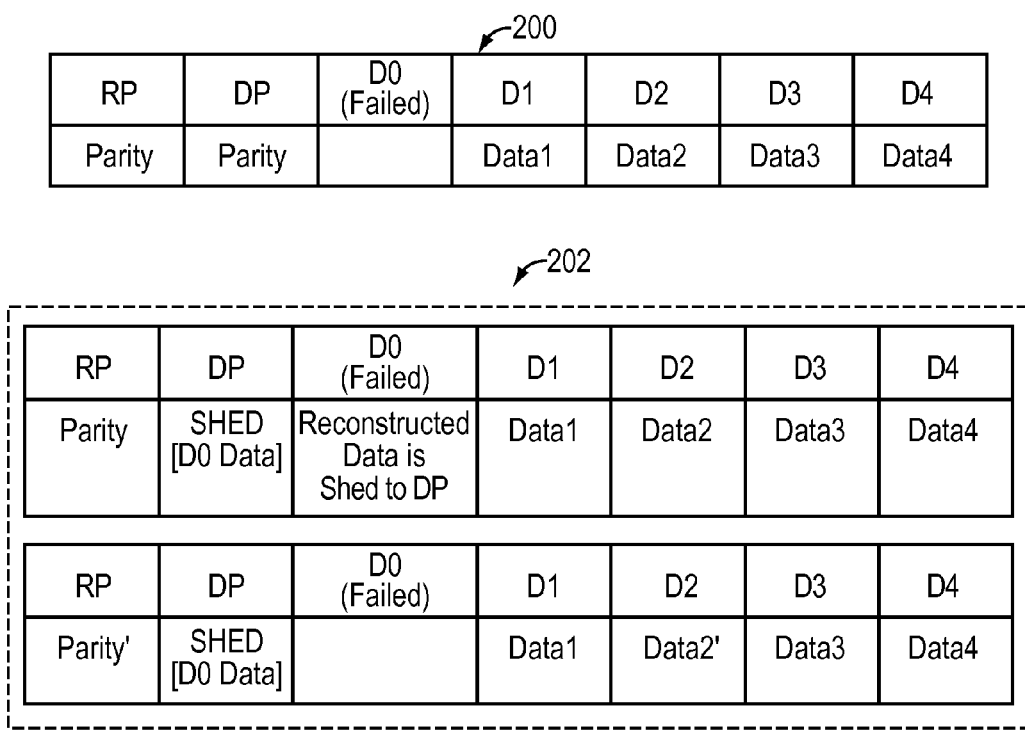

Referring to FIG. 7, shown is an illustration of the "parity shedding" technique in a RAID-6 group of a data storage system that may be included in an embodiment using the techniques described herein. With reference also to FIGS. 1-4, in at least one embodiment of the current technique, for example, FIG. 7 illustrates a scenario in which a write I/O request is directed to a data position that is not in a failed state. In the example 200, data storage system 12 includes a failed data drive (e.g., "D0") and is operating in the "degraded" mode 171. In example 202, the data storage system receives a write I/O request such that the write I/O request includes a write operation which is directed to a data position associated with a functional data drive (e.g., "D2"). In such a case, in accordance with the "parity shedding" technique described above, the write I/O request is considered as a degraded write operation because the data storage system 12 is operating in the "degraded" state. Thus, as part of the first phase of the degraded write, reconstructed data of the failed data drive (e.g., "D0") is written as "shed data" into a parity position such as DP in place of parity information previously stored in DP before writing new data into a data position of the functional data drive. The reconstructed data is computed in a memory of the data storage system based on data from other functional drives (e.g., "D1", "D2", "D3", D4") and parity information stored in a parity area (e.g., "RP", "DP"). As part of the second phase of the degraded write, new host data associated with the write I/O request directed to data drive "D2" is written to the data drive "D2". Concurrently, parity information in RP area is updated based on the new host data.

Referring to FIG. 8, shown is an illustration of the "parity shedding" technique in a RAID-6 group of a data storage system that may be included in an embodiment using the techniques described herein. With reference also to FIGS. 1-4, in at least one embodiment of the current technique, for example, FIG. 8 illustrates a scenario in which a degraded write includes a write operation that is directed to a data position which is in a failed state. In the example 210, a data storage system includes two failed data drives (e.g., "D3". "D4") and is in a "double degraded" state. In example 212, the data storage system 12 receives a write I/O request such that the write I/O request includes a write operation that is directed to a data position associated with a failed data drive (e.g., "D4"). In the example 210, the data storage system 12 is operating in the double degraded mode because the data storage system includes two failed disk (e.g., D3, D4). In such a case, the write I/O request is also referred to as a degraded write request. A degraded write is performed in three phases in accordance with the "parity shedding" technique described herein above. The first phase (also referred to as "pre-shedding") reconstructs data for the two failed data drives (e.g., "D3", "D4") in a memory of the data storage system 12 based on existing data from other functional drives (e.g., "D0", "D1", "D2") which has not been modified based on the write I/O request yet and parity information stored in a parity area (e.g., RP, DP). The reconstructed data for the failed drive D3 is written to parity position DP as shed data and the reconstructed data for the failed drive D4 is written to parity position RP as shed data. The second phase of the degraded write updates the shed data in the parity position RP with new host data associated with the write I/O request directed to data segment D4. The third phase writes new host data associated with a write I/O operation directed to a non-failed disk if the write I/O request also includes such write I/O operation. Further, the third phase waits for data storage system 12 to update shed data with the new host data. Thus, for example, if the write I/O request includes a write operation that is directed to a non-failed data position ("e.g., "D2"), the third phase then updates data of the data segment D2 with host data associated with the write operation. Further, during the third phase, write operations directed to functional data drives are performed concurrent to each other after the second phase ("post-shedding") completes successfully.

Referring to FIG. 9, shown is an illustration of a "parity unshedding" technique in a RAID-6 group of a data storage system that may be included in an embodiment using the techniques described herein. In at least one embodiment of the current technique, for example, FIG. 9 illustrates a scenario for reconstructing (or "rebuilding") data for a failed data disk of a storage system. A rebuild is an operation that usually operates on a parity stripe. The rebuild operation starts when a new functional disk is swapped into a storage array to replace a failed drive. The rebuild operation reconstructs data for the failed drive based on data from the remaining data disks and parity information stored in parity areas, and then writes the reconstructed data into the new disk. Further, if two disks are swapped into the data storage system at the same time, the two disks are rebuilt independent of each other. Generally, a storage processor of a data storage system goes to the first sector group in which a sector of a failed disk is to be reconstructed. The parity entry in that sector group is read and a determination is made as to whether that entry is a true parity entry or is the "shed data" of the failed disk which has been entered to replace the parity entry (i.e., a "parity shedding" operation has occurred). If parity shedding has occurred, the parity entry that is read is the desired reconstructed data and such data is written into the sector of the failed disk. If all sectors of the failed disk have been so rebuilt, the rebuilding process is done. If not, the storage processor goes to the next sector group and repeats the process to rebuild the data in the desired sector of the failed disk. The process is repeated until all sectors of the failed disk have been rebuilt.

With reference also to FIGS. 1-5, in the example 220, data storage system 12 includes two failed data drives (e.g., "D0", "D2") and thus operating in the double degraded state. Further, in the example 220, parity positions, RP and DP, include shed data for the two failed data disk drives. Further, in the example 222, a rebuild process for data drive D0 starts when D0 is replaced with a new drive. In at least one embodiment of the current technique, the rebuild process first reconstructs data for the two failed data drives (e.g., D0, D2) in a memory of the data storage system 12. Then, the rebuild process computes parity information for parity positions, RP and DP, based on the reconstructed data for the two failed disks and data for the remaining functional drives (e.g., D1, D3, D4). The rebuild process then finishes rebuilding of the failed drive D0 by writing the reconstructed data for D0 in the new drive that replaces the failed disk. Further, the rebuild process updates the parity positions, RP and DP, with the parity information that has been computed based on the reconstructed data.

Figure 10:
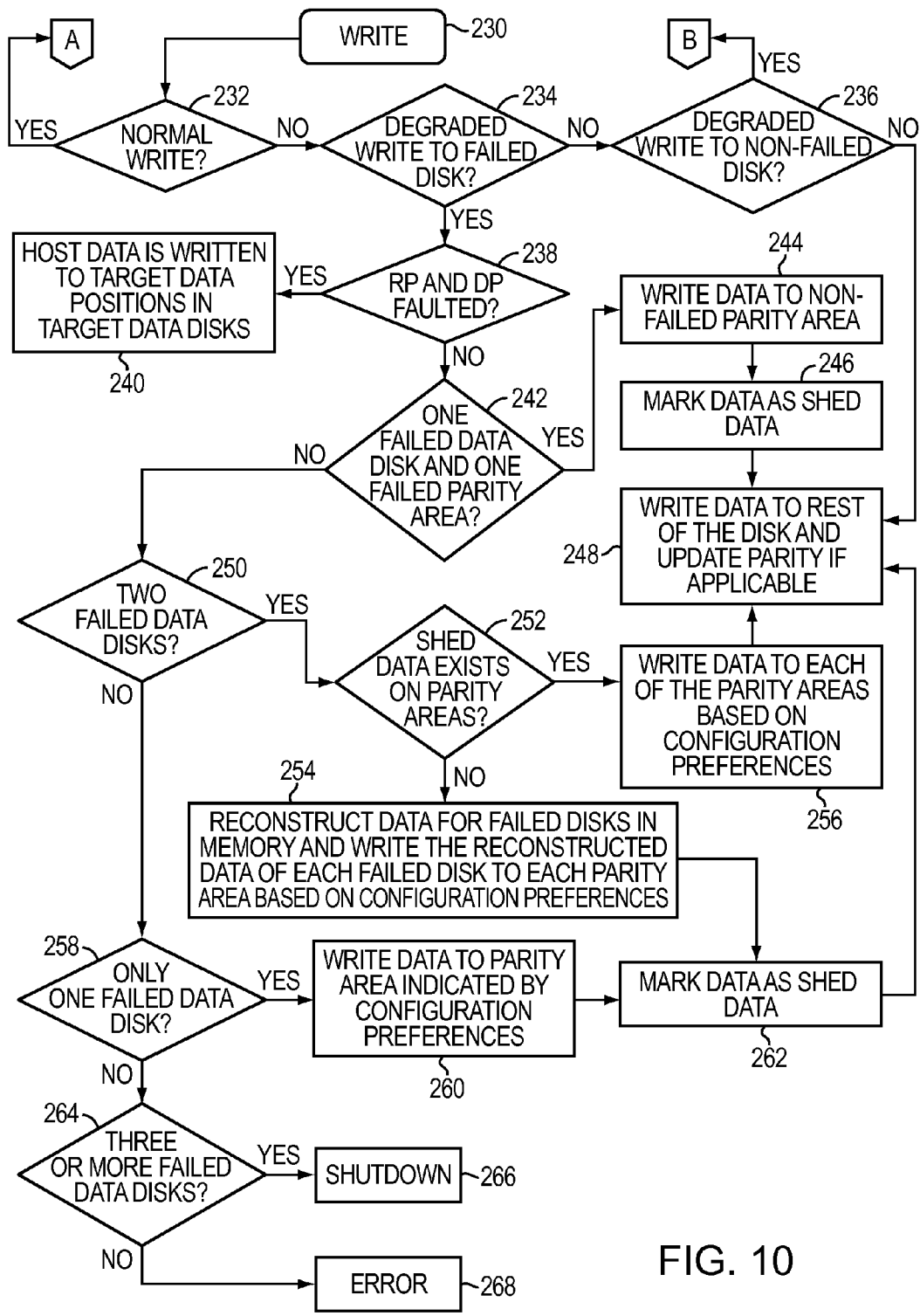
FIGS. 10-14 are flow diagrams illustrating processes that may be used in connection with techniques herein.
Figure 11:
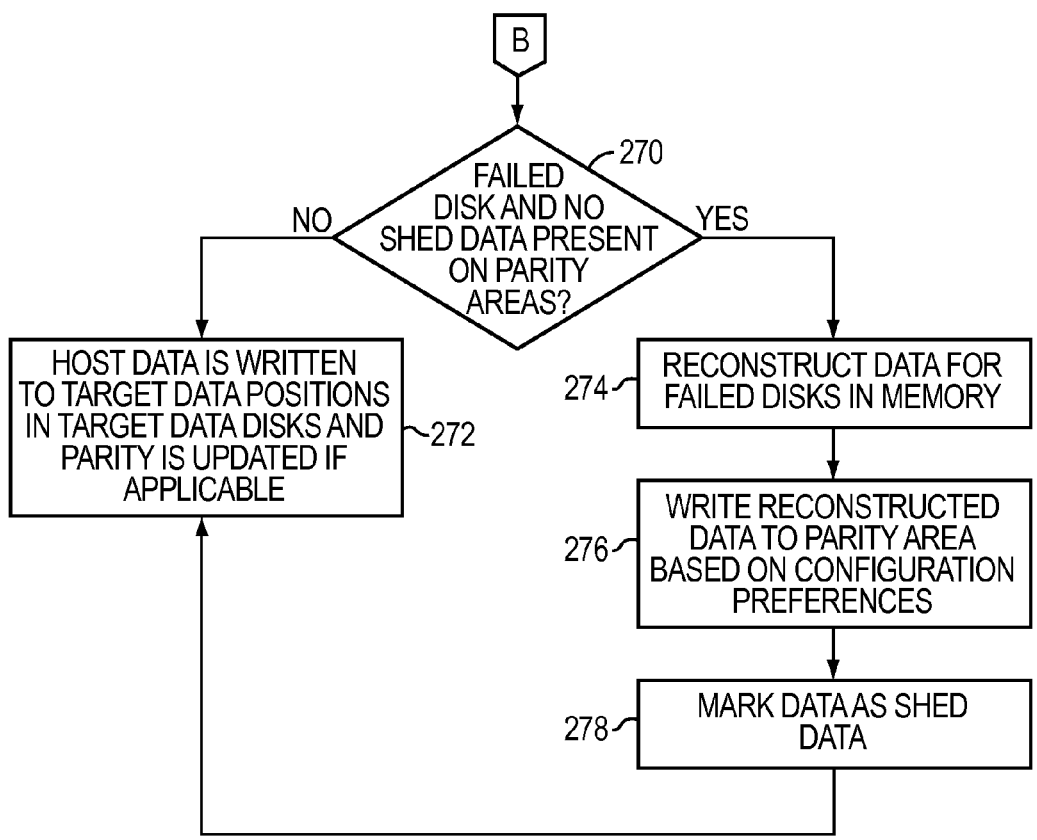
Figure 12:
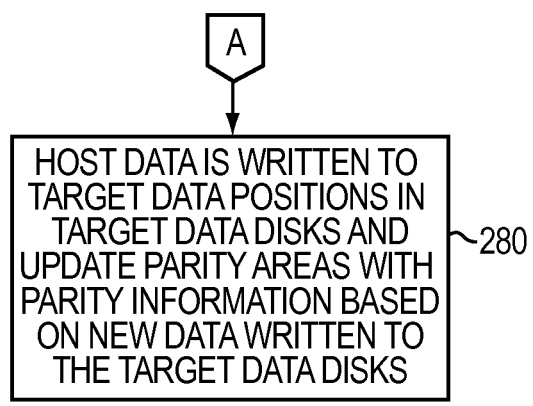

Referring to FIGS. 10-12, shown are more detailed flow diagrams illustrating managing data availability in accordance with the "parity shedding" technique in a storage system. With reference also to FIGS. 1-5, in at least one embodiment of the current technique, a write operation directed to a data position of a data disk of data storage system 12 can occur under different conditions (step 230). First such condition under which a write operation is directed to a data segment occurs under normal conditions where no disk failure and no power failure has occurred in the data storage system 12 and all disks, as well as storage processors, operates correctly (step 232). Second such condition under which a write operation is directed to a data segment occurs in a degraded mode condition where the data storage system 12 includes at least one failed disk, the write operation is directed to a non-failed disk, and data for the failed disk is capable of being reconstructed using data of non-failed disks and parity information (step 236). Third such condition under which a write operation is directed to a data segment occurs in a degraded mode where a disk into which the write operation is to be performed is a non-operating, or failed, disk (step 234).

With reference also to FIG. 12, at step 232, a determination is made as to whether the write operation is a normal write operation under the first condition described above herein. If the write operation directed to a data position of a data drive occurs under normal conditions, host data associated with the write operation is written to the data position in the data drive. Concurrently, parity areas (such as row parity position 150 and diagonal parity position 151) are updated with new parity information such that the new parity information is based on the host data that is being written to the data drive (step 280).

With reference also to FIG. 11, at step 236, a determination is made as to whether the write operation occurs under the second condition described above herein indicating that the write operation is a degraded write directed to an operational data drive. If the write operation is a degraded write directed to a data drive that is not in a failed state, a determination is made as to whether any one of the parity areas includes "shed data" (step 270). If no parity area includes "shed data", host data associated with the write operation is written to a target data position in the data drive and one or more parity areas are updated based on the host data that is being written to the data drive (step 272). However, if a parity area includes "shed data", data for a failed disk is reconstructed from parity information in the remaining parity areas and data in non-failed data drives (step 274). The reconstructed data is then written into a parity area associated with the failed disk (as part of the "parity shedding" operation) (step 276). Such data in the parity area is marked as shed data (step 278). The host data associated with the write operation is then written to the target data position in the operational data drive and one or more parity areas are updated based on the host data that is being written to the operational data drive (step 272).

Referring back to FIG. 10, at step 234, a determination is made as to whether the write operation directed to a data position in a disk occurs under the third condition described above herein indicating that the write operation is a degraded write. A determination is made as to whether the parity positions, RP and DP, are in a failed state (step 238). If RP and DP are in a failed state, host data associated with the write operation is written to the data position in the data drive (step 240). If the data storage system 12 includes one failed data disk and one failed parity position (step 242), host data associated with the write I/O operation which is targeted to the failed data disk is written to a non-failed parity area as "shed data" (step 244). Such data in the non-failed parity area is marked as shed data (step 246). However, if the data storage system 12 includes a single failed data disk (step 258), host data associated with the write operation directed to the failed data disk is written to a parity area based on a configuration preference such as mapping information stored in the configuration manager (step 260). Such data written in the parity area is marked as "shed data" (step 262). Further, if the data storage system 12 includes two failed data disks (step 250), a determination is made as to whether parity areas, RP and DP, include shed data (step 252). If the parity areas do not include shed data, data for the two failed data drives is reconstructed in a memory of the data storage system 12. The reconstructed data of each failed data drive is written to a parity area based on mapping information stored in the configuration manager (step 254). For example, data for the first failed drive may be written to DP and data for the second failed drive may be written to RP. If the parity areas include shed data, data associated with the write I/O request targeted to a failed data disk is written to a parity area corresponding to the failed data disk (step 256). Further, if the write I/O request includes a write operation which is directed to any one of the remaining functional data drives, the data is written to appropriate data position in the remaining functional data drives and parity information is updated if the data storage system 12 includes any non-failed parity position which does not include shed data for a failed data drive (step 248). However, if the data storage system 12 includes three or more failed disks (step 264), a RAID group that includes the three or more failed disk is shutdown (step 266).

Figure 13:
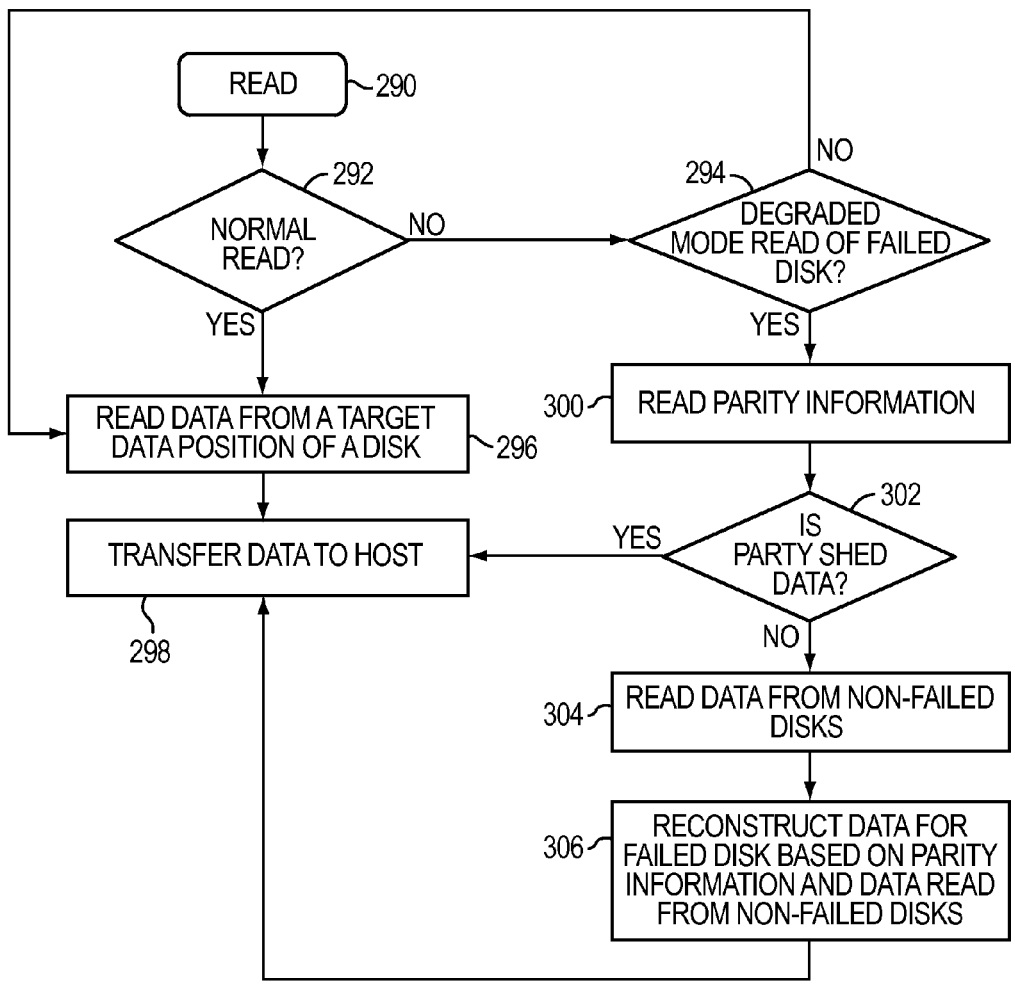

Referring to FIG. 13, shown is a more detailed flow diagram illustrating managing data availability in accordance with the "parity shedding" technique in a storage system. With reference also to FIGS. 1-5, in at least one embodiment of the current technique, when data is to be read (step 290), it is read either from a non-failed disk in a normal, non-degraded mode or in a degraded mode in which there is a failed disk, where the read is to be from the failed disk. If a read operation occurs in the normal mode (step 292), a storage processor reads the data directly from the desired sector or data position and transfers such data to the host (step 296, 298).

If a read operation is directed to a non-failed disk where data storage system 12 is operating in a degraded mode, the read operation occurs similar to the processing performed in the normal mode such that a storage processor reads the data directly from the desired sector or data position and transfers such data to the host (step 296, 298).

In reading from a failed disk in a degraded mode, information is read from a parity area (step 300) and a determination is made as to whether such information in the parity area is "shed data" (step 302). If the information read from the parity area is shed data, it is read directly from the parity area and transferred to the host (step 298). If the information read from the parity area is not shed data, the data in the other non-failed disks are read (step 304). Data for the failed disk is reconstructed from the data from the other non-failed disks and information read from the parity area (step 306). The reconstructed data is then transferred to the host (step 298).

Figure 14:
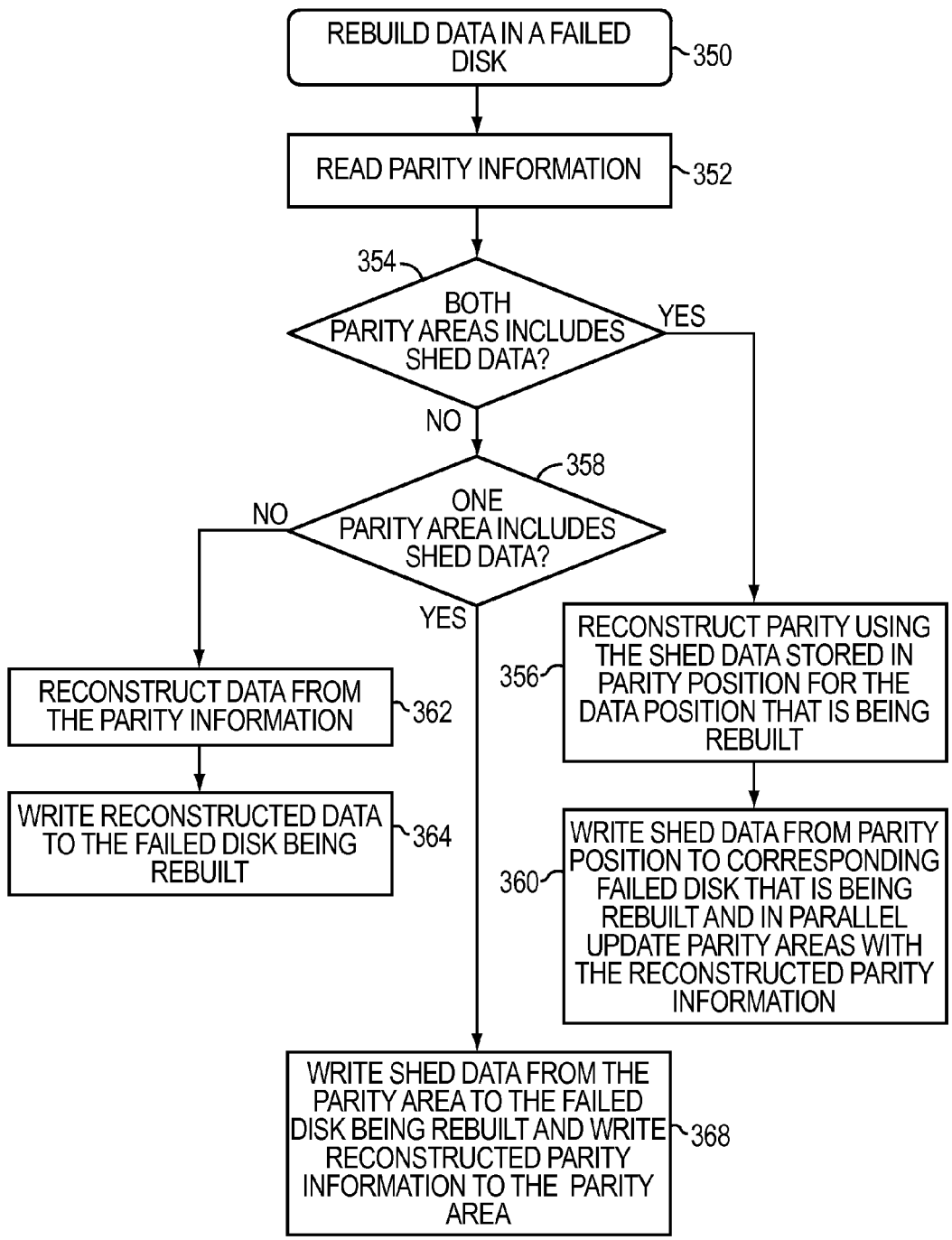

Referring to FIG. 14, shown is a more detailed flow diagram illustrating managing data availability in accordance with the "parity shedding" technique in a storage system. With reference also to FIGS. 1-4, a rebuild operation is performed when a failed disk in data storage system 12 is replaced by a new functional disk (step 350). In order to rebuild data for the failed disk, information is read from a parity area such as RP and DP (step 352). If the parity areas, RP and DP, include shed data (step 354), parity information is reconstructed based on shed data stored in the parity areas (step 356). The shed data from a parity area associated with the failed disk is written to the failed disk which is being rebuilt (step 360). Concurrently, the reconstructed parity information is written to appropriate parity areas. However, if only one parity area includes shed data (step 358), the shed data from the parity area is written to the failed disk which is being rebuilt (step 380). Concurrently, the reconstructed parity information is written to the parity area. If none of the parity area includes shed data, data for the failed disk is reconstructed from parity information stored in a parity area (e.g., RP, DP) (step 362). The reconstructed data is written to the failed disk which is being rebuilt (step 364).

As will be apparent to those of ordinary skill in the art, there may be a variety of different ways and processing steps in which to recover the various data segments of the two failed drives. For two failed data drives depending on which drives have failed, different data segments included therein may be recoverable using an associated RP and/or DP segment. A data segment recovered at a first point in time may be used in restoring a different data segment of the same device at a later point in time depending on which data segments are known and used in forming the various RP and DP segments.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing data availability in storage systems, the method comprising:
receiving a request to write new data to a disk of a plurality of disks of a data storage system, wherein the plurality of disks includes a row parity area and a diagonal parity area, wherein the row parity area includes row parity information and the diagonal parity area includes diagonal parity information, wherein up to two disks of the plurality of disks are having a problem;
reconstructing old data of at least one failed disk in a memory of the data storage system;
writing the reconstructed old data of the at least one failed disk to a parity area selected from the row and diagonal parity areas based on a configuration preference; and
writing the new data to the parity area selected based on the configuration preference, wherein metadata of the parity area is updated to indicate that the parity area includes user data instead of parity information.

2. The method of claim 1, wherein the problem of a disk of the plurality of disks includes a failure to access contents of the disk.

3. The method of claim 1, wherein a disk of the plurality of disks includes a set of data segments and a set of parity segments, wherein a parity segment of the set of parity segments stores parity information for a subset of the set of data segments.

4. The method of claim 1, wherein a parity area includes a row parity area and a diagonal parity area, wherein parity information for the row parity and diagonal parity area is formed by performing a logical exclusive-OR operation upon a respective grouping of data segments for each of the parity areas.

5. The method of claim 4, wherein data for a first failed disk is written to the diagonal parity area and data for a second failed disk is written to the row parity area.

6. The method of claim 1, wherein if only a single disk of the plurality of disks of the data storage system has the problem, the method further comprising:
determining whether the request to write the new data includes a first write operation directed to the single disk having the problem;
based on the determination that the first write operation is directed to the single disk having the problem, writing host data associated with the first write operation to the first parity area;
determining whether the request to write the new data includes a second write operation directed to a disk of the plurality of disks, wherein the disk associated with the second write operation is without the problem;
based on the determination that the second write operation is directed to the disk without the problem, writing host data associated with the second write operation to the disk without the problem; and
updating parity information of a parity area, wherein the parity area includes the parity information for the disk without the problem, wherein the parity information is updated concurrently with writing the host data associated with the second write operation to the disk without the problem.

7. The method of claim 1, wherein if first and second disks of the plurality of disks of the data storage system are having the problem, the method further comprising:
determining whether the request to write the new data includes a write operation directed to a disk of the plurality of disks, wherein the disk associated with the write operation is without the problem;
based on the determination, writing host data associated with the write operation to the disk without the problem; and
updating parity information of a parity area, wherein the parity area includes the parity information for the disk without the problem, wherein the parity information is updated concurrently with writing the host data to the disk.

8. The method of claim 1, further comprising:
updating metadata associated with the parity area, wherein the metadata indicates the parity area stores shed data, wherein the shed data is data for a disk that has a problem.

9. A method for use in managing data availability in storage systems, the method comprising:
- receiving a request to rebuild a disk of a plurality of disks of a data storage system, wherein the plurality of disks includes a row parity area and a diagonal parity area, wherein the row parity area includes row parity information and the diagonal parity area includes diagonal parity information, wherein the disk of the plurality of disks has a problem;
- reconstructing parity information in a memory of the data storage system based on shed data stored in the row and diagonal parity areas;
- writing shed data from a parity area selected from the row and diagonal parity areas based on a configuration preference to the disk; and
- writing the reconstructed parity information to the row and diagonal parity areas, wherein the reconstructed parity information is written concurrently with writing the shed data from the parity area selected based on the configuration preference to the disk.

10. A system for use in managing data availability in storage systems, the system comprising:
- a plurality of disks of a data storage system;
- first logic receiving a request to write new data to a disk of the plurality of disks of the data storage system, wherein the plurality of disks includes a row parity area and a diagonal parity area, wherein the row parity area includes row parity information and the diagonal parity area includes diagonal parity information, wherein up to two disks of the plurality of disks are having a problem;
- second logic reconstructing old data of at least one failed disk in a memory of the data storage system;
- third logic writing the reconstructed old data of the at least one failed disk to a parity area selected from the row and diagonal parity areas based on a configuration preference; and
- fourth logic writing the new data to the parity area selected based on the configuration preference, wherein metadata of the parity area is updated to indicate that the parity area includes user data instead of parity information.

11. The system of claim 10, wherein the problem of a disk of the plurality of disks includes a failure to access contents of the disk.

12. The system of claim 10, wherein a disk of the plurality of disks includes a set of data segments and a set of parity segments, wherein a parity segment of the set of parity segments stores parity information for a subset of the set of data segments.

13. The system of claim 10, wherein a parity area includes a row parity area and a diagonal parity area, wherein parity information for the row parity and diagonal parity area is formed by performing a logical exclusive-OR operation upon a respective grouping of data segments for each of the parity areas.

14. The system of claim 13, wherein data for a first failed disk is written to the diagonal parity area and data for a second failed disk is written to the row parity area.

15. The system of claim 10, wherein if only a single disk of the plurality of disks of the data storage system has the problem, the system further comprising:
- fifth logic determining whether the request to write the new data includes a first write operation directed to the single disk having the problem;
- sixth logic writing, based on the determination that the first write operation is directed to the single disk having the problem, host data associated with the first write operation to the first parity area;
- seventh logic determining whether the request to write the new data includes a second write operation directed to a disk of the plurality of disks, wherein the disk associated with the second write operation is without the problem;
- eighth logic writing, based on the determination that the second write operation is directed to the disk without the problem, host data associated with the second write operation to the disk without the problem; and
- ninth logic updating parity information of a parity area, wherein the parity area includes the parity information for the disk without the problem, wherein the parity information is updated concurrently with writing the host data associated with the second write operation to the disk without the problem to the disk.

16. The system of claim 10, wherein if first and second disks of the plurality of disks of the data storage system are having the problem, the method further comprising:
- fifth logic determining whether the request to write the new data includes a write operation directed to a disk of the plurality of disks, wherein the disk associated with the write operation is without the problem;
- sixth logic writing, based on the determination, host data associated with the write operation to the disk without the problem; and
- seventh logic updating parity information of a parity area, wherein the parity area includes the parity information for the disk without the problem, wherein the parity information is updated concurrently with writing the host data to the disk.

17. The system of claim 10, further comprising:
- fifth logic updating metadata associated with the parity area, wherein the metadata indicates the parity area stores shed data, wherein the shed data is data for a disk that has a problem.

* * * * *